Aug. 31, 1926.

H. FABIAN ET AL 1,598,272

KNIFE SHARPENING ATTACHMENT FOR FABRIC CUTTING MACHINES

Filed March 13, 1926    5 Sheets-Sheet 1

INVENTORS
Harry Fabian
William J. Van Buchwald
By W. W. Williamson Atty.

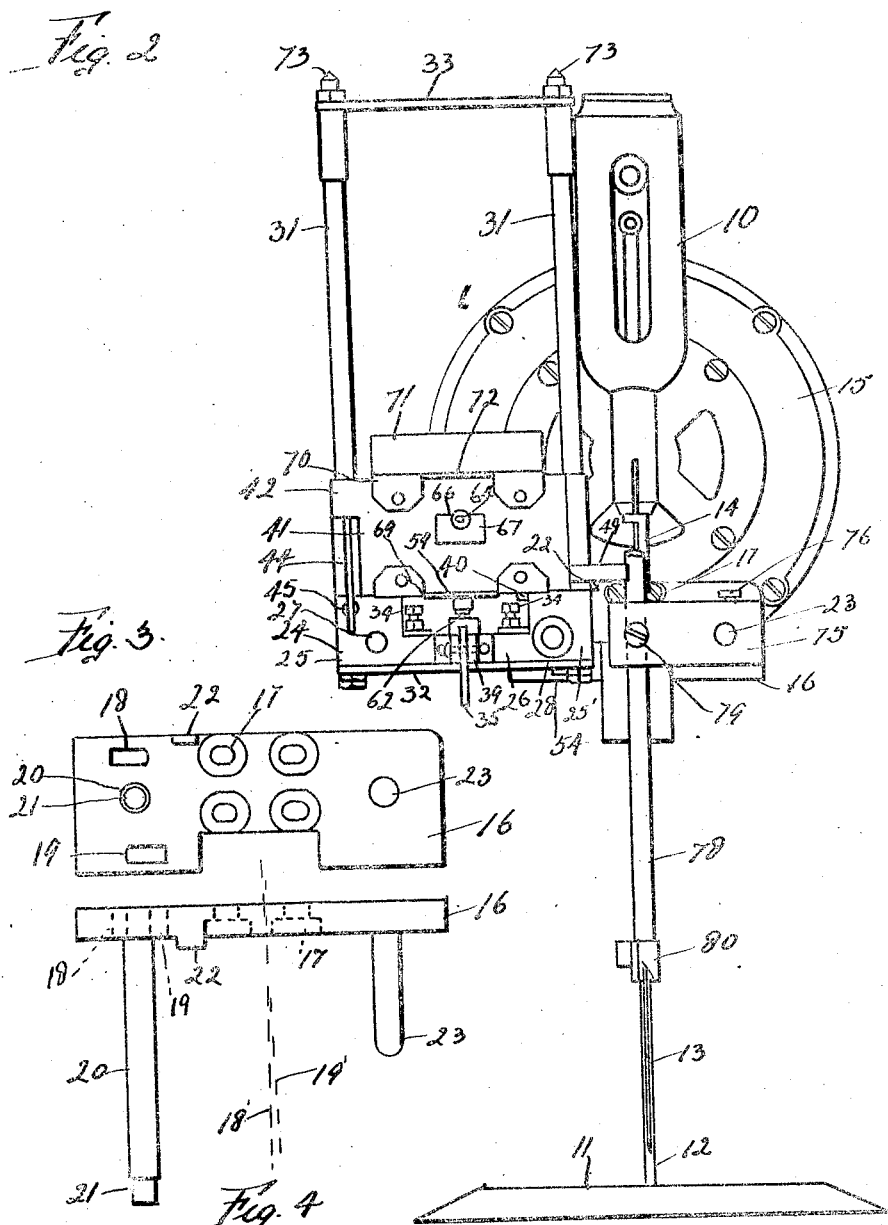

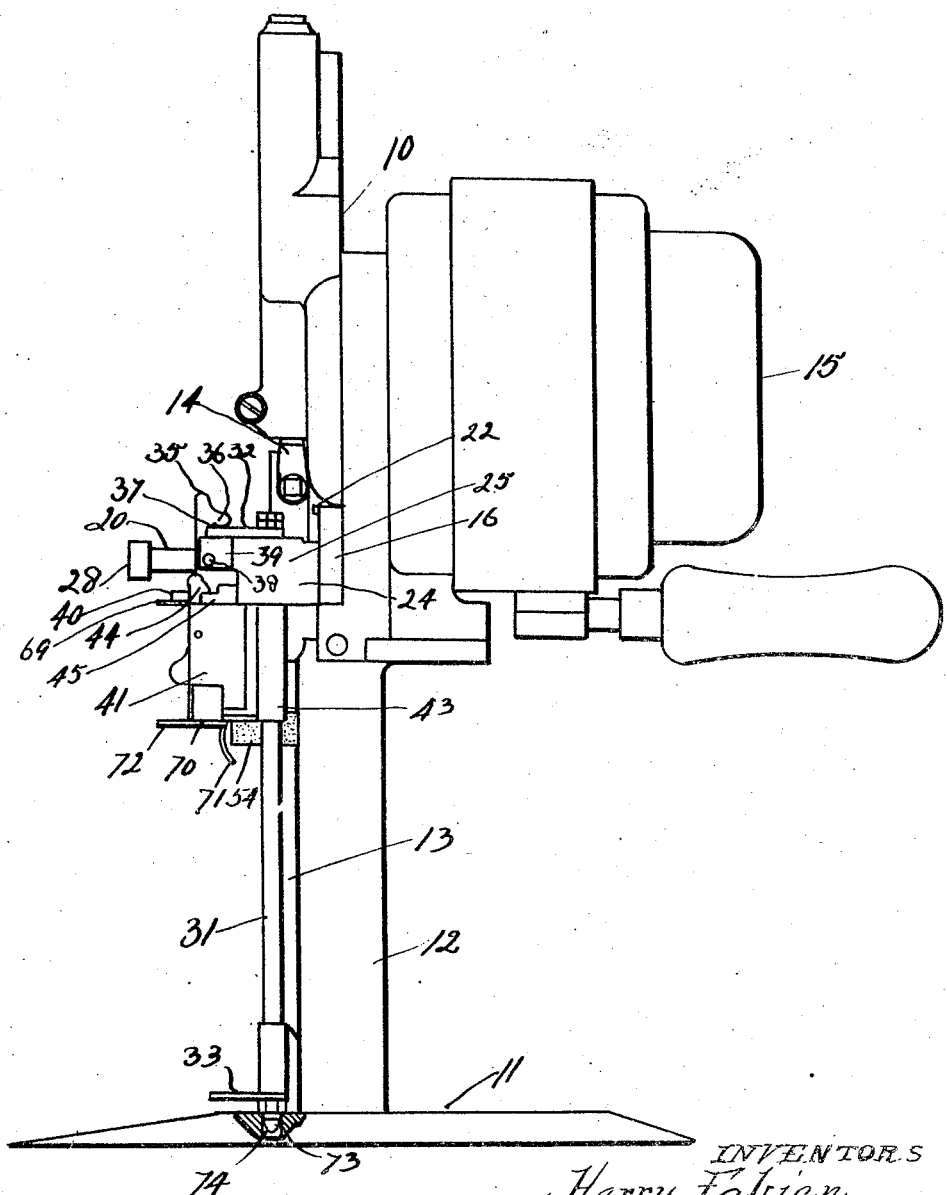

Aug. 31, 1926.

H. FABIAN ET AL 1,598,272

KNIFE SHARPENING ATTACHMENT FOR FABRIC CUTTING MACHINES

Filed March 13, 1926    5 Sheets-Sheet 4

INVENTORS
Harry Fabian
William J. Van Buchwald
By W. W. Williamson
Atty.

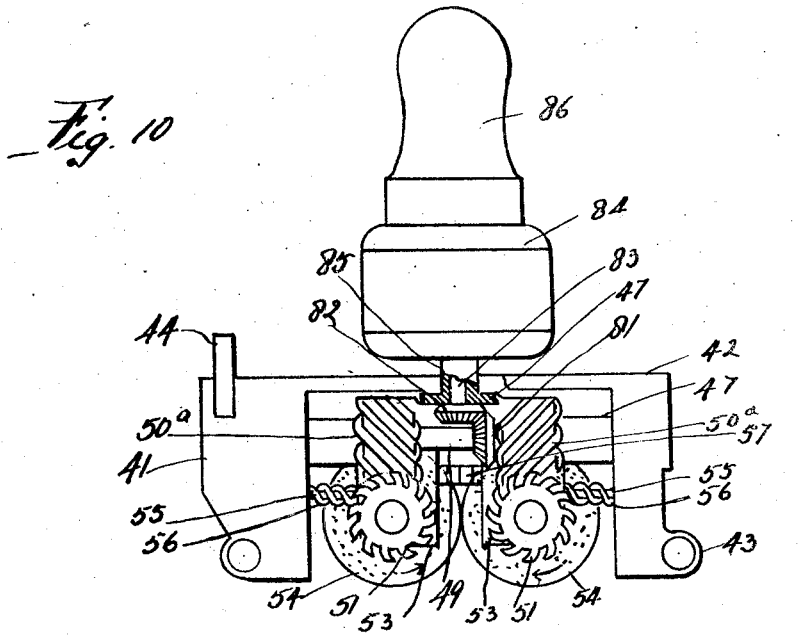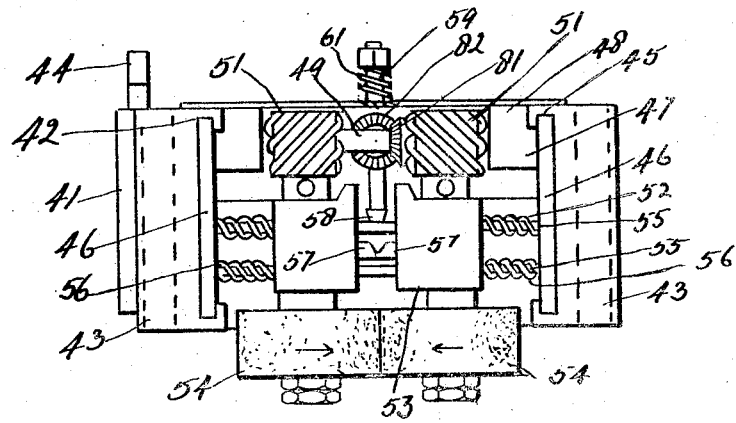

Patented Aug. 31, 1926.

1,598,272

UNITED STATES PATENT OFFICE.

HARRY FABIAN AND WILLIAM J. VAN BUCKWALD, OF PHILADELPHIA, PENNSYLVANIA.

KNIFE-SHARPENING ATTACHMENT FOR FABRIC-CUTTING MACHINES.

Application filed March 13, 1926. Serial No. 94,443.

Our invention relates to new and useful improvements in a knife sharpening attachment for fabric cutting machines, and has for its primary object to provide an exceedingly simple and effective device of this character whereby a reciprocating knife on a cutting machine may be readily and quickly sharpened, and the attachment swung out of the way when not in use.

Another object of the invention is to provide guides for the knife sharpening attachment whereby the latter will be caused to travel in a vertical line parallel with the knife.

A further object of the invention is to provide a unique method of mounting the attachment upon a fabric cutting machine in order that it may be readily placed in operative position or moved to an inoperative position.

A still further object of the invention is to provide for adjusting the several parts.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which:—

Fig. 2 is a view similar to Fig. 1, with the knife sharpening attachment in an inoperative position.

Fig. 3 is a front elevation of the latch plate.

Fig. 4 is an upper edge view thereof.

Fig. 5 is a side elevation of the fabric cutting machine with the knife sharpening attachment thereon.

Fig. 9 is an end view of the sharpening tool carriage with a portion broken away and shown in section to illustrate the means for adjusting the tool frame.

Fig. 10 is a plan view of the tool carriage showing a modified form of driving means and another method of applying power, with the top cover removed and a portion broken away and parts shown in section to illustrate the details of construction.

Fig. 11 is a rear view of the carriage in Fig. 10.

Figure 1:
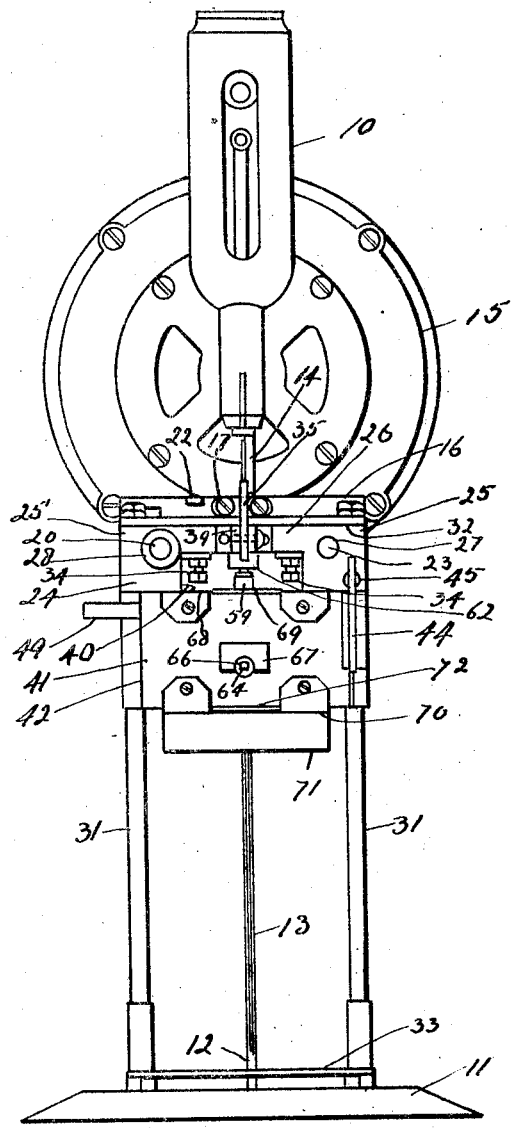
Fig. 1 is a front elevation of a fabric cutting machine having our knife sharpening attachment applied thereto.
Figure 6:
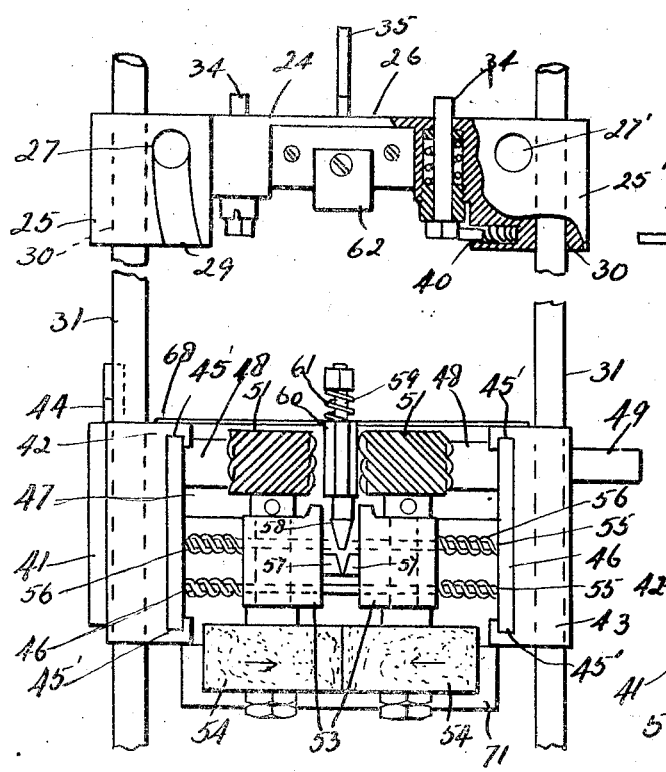
Fig. 6 is a rear view of the attachment removed from the fabric cutting machine with portions broken away and parts shown in section to illustrate details of construction.
Figure 8:
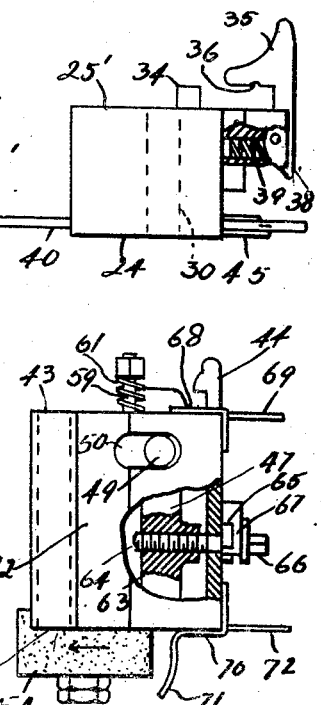
Fig. 8 is an end view of the carrier for the guides with a portion in section to illustrate the operation of the latch.

In carrying out our invention as herein embodied, 10 represents a fabric cutting machine including a base 11, an upright 12, a portion of which acts as a guide for the reciprocating knife 13 connected by a pitman 14 with suitable mechanism driven by electric motor 15, or other suitable power means.

On a suitable portion of the fabric cutting machine adjacent the upper end of the knife is mounted a latch plate 16 having elongated holes 17 for the reception of suitable fastening devices, such as screws, said elongated holes permitting sidewise adjustment of the latch plate, and in actual practice, said latch plate is mounted on the machine, at an angle other than a right angle to the knife, as shown in Fig. 4, where the dotted line 18' represents the center of the knife and the dotted line 19' represents the center of the latch plate. This latch plate has two latch keeper openings 18 and 19, one above and one below the trunnion 20 having a reduced outer end 21 to receive a collar, which will be later described. Said latch plate also has a lug 22 adjacent but above the position of the trunnion 20, while at the other end of said plate opposite the trunnion 20 is a post 23, preferably having a rounded outer end, as shown in Fig. 4.

The reference numeral 24 denotes a carrier including two blocks 25 and 25', joined by an integral bridge 26, and each of these blocks has a horizontal hole 27—27' running entirely therethru from the front to the rear face for registration with the trunnion and post 20 and 23 respectively. When the carrier is mounted on the trunnion, a collar 28 is fixed to the reduced end of said trunnion to prevent withdrawal of the carrier while permitted a limited sliding movement as well as a rotary movement thereon, and in order to readily align the hole 27 with the post 23, a slot 29 is formed in the rear face of the block 25 leading from its lower edge to the hole 27. The blocks 25—25' also have vertical holes 30 running entirely therethru for the passage of the guide rods 31, which are arranged in parallel spaced relation to each other and so held by the end spacing plates 32 and 33.

In the carrier are mounted a pair of spring pressed pins 34 which project beyond the outer face of the carrier bridge for coaction with the spacing plate 32 to give an initial movement to said spacer plate and the guide rods when unlatched from the spacer plate 32, the latching means being represented by the numeral 35, the nose of which has a notch 36 for engagement with the projection 37 on the outer face of the spacing plate 32. This latching means is pivoted at 38 between the ears of a suitable bracket 39 mounted on the front face of the carrier.

A spring actuated latch 40 is pivoted in the block 25' for coaction or registration with either of the latch keeper openings 18 and 19, depending upon the position of the carrier, as will be later described.

Figure 7:
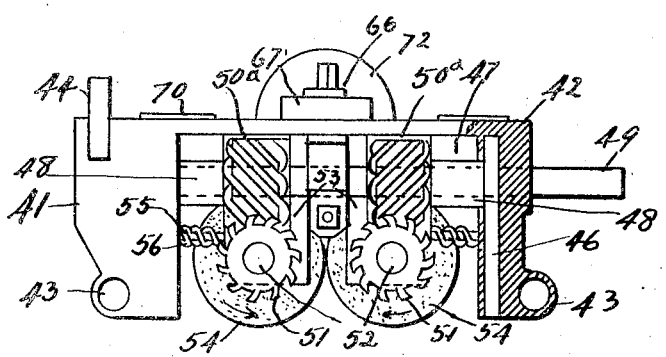
Fig. 7 is a plan view of the sharpening tool carriage with the top plate removed and a portion of the carriage shown in section to illustrate details of construction.

On the guides 31 is slidably mounted a sharpening tool carriage 41, including a shell 42 provided with guide sockets 43 which register with the guides 31, and this shell is provided with a spring actuated latch 44 for engagement with the pin 45 projecting from the front face of one of the carrier blocks, as 25, to hold the carriage in an inactive position. In the shell are formed or provided trackways 45' arranged in pairs to receive the slides 46 which form a part of the frame 47 including bearing blocks 48 in which is journalled a drive shaft 49, one end of which projects thru a slot 50 in the shell and is adapted for connection with a suitable driving means, such as a flexible shaft (not shown) suitably connected with the motor of the fabric cutting machine. On the drive shaft 49 between its bearing blocks are fixed two gears 50ª, one of which is a right hand gear and the other a left hand gear, and these mesh with similar gears 51 mounted on the inner ends of the stub shafts 52, journalled in other bearing blocks 53, while on the outer ends of said stub shafts are fixed the grinding wheels 54 so that one travels clockwise and the other counterclockwise, as may be noted by the arrows on the grinding wheels in Fig. 7.

The bearing blocks 53 are slidably mounted on the rods 55 having their ends fixed in the slides 46, and said bearing blocks 53 are normally forced toward each other by springs 56 coiled about the rods 55, with one end of each bearing against a slide as the stationary element and the other end against a bearing block as the movable element, so that said bearings tend to normally hold the grinding wheels in contact or in close proximity to each other, which is desirable during the grinding operations. Each of the bearing blocks 53 has a boss 57 projecting from the side opposite that against which the springs are acting, so that the bosses of the bearing blocks project toward each other in endwise alignment with the small space between them for the insertion of the wedge 58 carried on the inner end of the plunger 59 slidably mounted in the plunger housing 60, and normally pressed outwardly by the spring 61, but when the carriage is moved inward or toward the carrier 24, the outer end of said plunger will engage the stop block 62 mounted on the carrier, and therefore said plunger will be forced inward until the wedge is projected between the bosses 57, thereby forcing apart the bearing blocks 53 and likewise the grinding wheels associated therewith.

The frame 47 has a screw-threaded hole 63 in its front wall into which is threaded a screw 64 passing thru the front wall of the shell with two collars 65 and 66 thereon, one of which is positioned on each side of the collar plate 67, fixed to the front wall of the shell and, if found desirable, the screw 64 may have its outer end shaped to receive a key wrench or other suitable tool for rotating said screw, which will move the frame 47 in or out of the shell because of the slides 46, thereby adjusting the grinding wheels relative to the knife with which they are being used.

The inner end of the carriage, or the top end when considered with the device in use, is enclosed by a cover plate 68 mounted on the shell, and has a finger piece 69, projecting therefrom; while the outer, bottom end of said shell is enclosed by another plate 70 having its inner end turned down to form an apron or guard 71 disposed in front of the grinding wheels, and from the plate 70 projects a finger piece 72.

The lower ends of the guides 31 are tapered to provide positioning points 73 for registration with sockets 74 in the base 11 of the fabric cutting machine when the sharpening attachment is in the place shown in Figs. 2 and 5.

When the knife sharpening attachment is not in use or is moved to an inoperative position as shown in Fig. 2, the presser foot block 75 is placed upon the post 23 and held in place by the screw 76, and this block carries a presser foot rod 78 held in different adjusted positions in the block by a screw 79, the lower end of the rod carrying the presser foot 80, which is used in the ordinary manner for holding the goods while being cut.

In practice, the parts are positioned as shown in Figs. 1 and 5 when the sharpener is to be used, at which time guides 31 are parallel with the knife blade 13; then by applying the motive power to the shaft 49, the grinding wheels will be revolved, and by disengaging the latch 44 from the pin 45, the carriage may be moved up and down on the guides 31 by taking hold of the finger pieces 69 and 72 and during the movement of the carriage up and down on the guides 31, the grinding wheels will sharpen the knife, as will be obvious, since said knife projects into the space between said grinding wheels, and after the knife has been sufficiently sharpened, the carriage is moved outward until the latch 44 engages the pin 45 to fasten said carriage to the carrier 24, and in so doing the outer end of the plunger 59 engages the stop block 62, so that the wedge 58 on said plunger is driven in between the bosses 57, thereby moving apart the bearing blocks 53 so as to separate the grinding wheels 54 and move them out of contact with the knife blade. As the grinding wheels wear down or the knife is ground away, said grinding wheels may be moved to a position for contact with the knife blade by adjusting the frame 47 in the carriage thru the medium of the adjusting screw 64, whereas, when a new knife or new wheels are put in place, said frame may be drawn into the shell of the carriage by the same adjusting means.

When the parts are in the operative position as shown in Figs. 1 and 5, the latch 40 is in engagement with the latch keeper opening 19 in the plate 16, so that after the sharpening operations have been accomplished, and it is desired to move the attachment to the inoperative position shown in Fig. 2, the latch 35 is disengaged from the spacing plate 32, and because of the spring operated plungers 34 an initial upward movement will be given to said spacing plate 32, which will carry the guides 31 with it thereby withdrawing the tapered ends 73 of said guides from the sockets 74 in the base of the machine. After this the latch 40 is disengaged from the knife, as at 19, and the carrier is moved outward or forward until it passes beyond the outer end of the post 23, and this is possible because said post is shorter than the trunnion 20, but the outward movement of said carrier will be limited by the collar 28 on the reduced end of said trunnion. The carrier will now be rotated about the trunnion 20, carrying with it the guides and carriage, and as soon as the carrier is in a reversed position, as shown in Fig. 2, it may be slid vertically along the trunnion 20 until the carrier passes beneath the lug 22 on the latch plate 16 and the latch 40 enters into engagement with the latch keeper opening 18, thereby holding the knife sharpening attachment in an inoperative position until it is desired to again use it for sharpening the knife. By reversing the operations just described, the device will be placed in an operative position.

As shown in Figs. 10 and 11, the drive shaft 49 may have a bevel gear 81 fixed thereon to mesh with the bevel gear 82 on the shaft 83 of a small motor 84 mounted on the bearing 85 which is connected with or formed as a part of the frame 47. The balance of the construction of the device and the operation are identical with that hereinbefore described, but in order to provide an easy method of moving the carriage vertically along the guides, the handle 86 may be connected with the small motor.

Of course we do not wish to be limited to the exact details of construction as herein shown, as these may be varied within the limits of the appended claims without departing from the spirit of our invention.

Having thus fully described our invention, what we claim as new and useful is:—

1. The combination with a fabric cutting machine including a base, an upright standard and a vertically reciprocating knife of a latch plate adjustably mounted on a machine, a trunnion projecting from the latch plate, a carrier slidably and rotatably mounted on said trunnion, a post projecting from the latch plate, for registration with a hole in the carrier but of less length than the trunnion, whereby the outward movement of the carrier will disengage it from the post, the rear face of said carrier having an arcuate groove leading to the hole which registers with the post, means mounted on the carrier and coacting with the latch plate to temporarily fasten the carrier in front of the latch plate, or to either side thereof and a lug projecting from the upper edge of the latch plate beneath which a portion of the carrier projects when swung to one side of said latch plate.

2. The combination with a fabric cutting machine including a base, an upright standard and a vertically reciprocating knife, of a plate secured to the machine, a trunnion projecting from said plate, a carrier slidably and rotatably mounted on the trunnion for disposition in front of the plate or to one side thereof, guides slidably mounted in the carrier spacing plate connected to said guides, a latch on the carrier for engagement with one of the spacing plates to hold the guide in an operative position, a carriage slidably mounted on the guides, means to temporarily latch said carriage to the carrier, grinding wheels in the carriage and means to revolve said wheels.

3. The structure set forth in claim 2 wherein the guides are provided with positioning points for registration with holes in the base of the machine where they will be held when the spacing plate is latched to the carrier and all parts are in operative position.

4. The combination with a fabric cutting machine including a base plate, an upright standard and a reciprocating knife, of a plate mounted on the machine, a trunnion projecting from said plate, a carrier mounted on said trunnion, guides in the carrier, a carriage slidably mounted on the guides, a pair of parallel rods in the carriage, bearing blocks slidably mounted on said rods, springs coiled about said rods for normally forcing the bearing blocks toward each other, means mounted in the carriage for sliding movement between the bearing blocks to force said blocks apart when an end of said means coacts with the carrier, shafts journalled in the bearing blocks, grinding wheels on said shafts for coaction with the knife and means to revolve said shafts in directions opposite to each other.

5. The combination with a fabric cutting machine, of a plate mounted on said machine, a trunnion projecting from said plate, a carrier rotatably and slidably mounted on said trunnion, means to hold said carrier in front of the plate or to one side thereof, guides slidably mounted in the carrier, spacing plates fixed to the guides, means mounted on the carrier for coaction with one of the spacing plates to latch the same and the guides in an operative position, means in the carrier coacting with a spacing plate to give an initial sliding movement to the guides through said plate and tool sharpening means slidably mounted on the guides.

6. The combination with a fabric cutting machine including a base plate having holes therein, an upright standard and a vertically reciprocating knife, of a carrier, means to adjustably mount said carrier on the machine, guides slidably mounted in the carrier and lying parallel to the knife with their outer ends in the holes in the base plate when said guides are in an operative position, spacing plates on said guides, means to hold the guides in an operative position, means to give said guides an initial sliding movement so as to disengage their ends from the holes in the base plate, a carriage slidably mounted on the guides, means to latch the carriage to the carrier, said carriage including a shell and a frame slidable backward and forward in the shell, means to move said frame for adjusting purposes, a pair of parallel rods mounted in the frame, bearing blocks slidably mounted on said rods, springs normally forcing said blocks toward each other, a boss projecting from each bearing block toward each other and in endwise alignment, a plunger slidably mounted within the frame and projecting outside thereof for coaction with the carrier for movement in one direction, a spring to move said plunger in the other direction, a wedge on the inner end of the plunger for projection between the bosses on the bearing blocks in order to move said blocks apart, stub shafts journalled in said bearing blocks, grinding wheels on said shafts, gears fixed to said shafts, one being right handed and the other left handed, a drive shaft journalled in the frame, adapted to receive its power from a suitable source of motion and gears fixed to said last named shaft for coaction with the gears on the stub shafts.

In testimony whereof, we have hereunto affixed our signatures.

HARRY FABIAN.
WILLIAM J. VAN BUCKWALD.